May 26, 1931. E. J. LEES 1,807,101
AUTOMATIC TEMPERATURE CONTROL
Filed Aug. 9, 1929 5 Sheets-Sheet 1
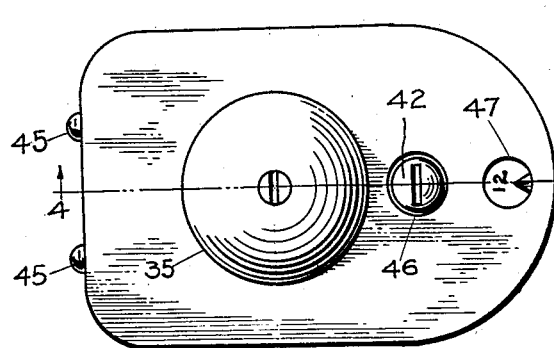
Fig. 2
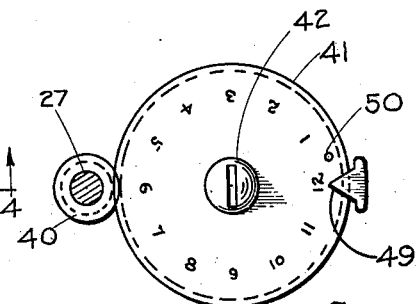
Fig. 3
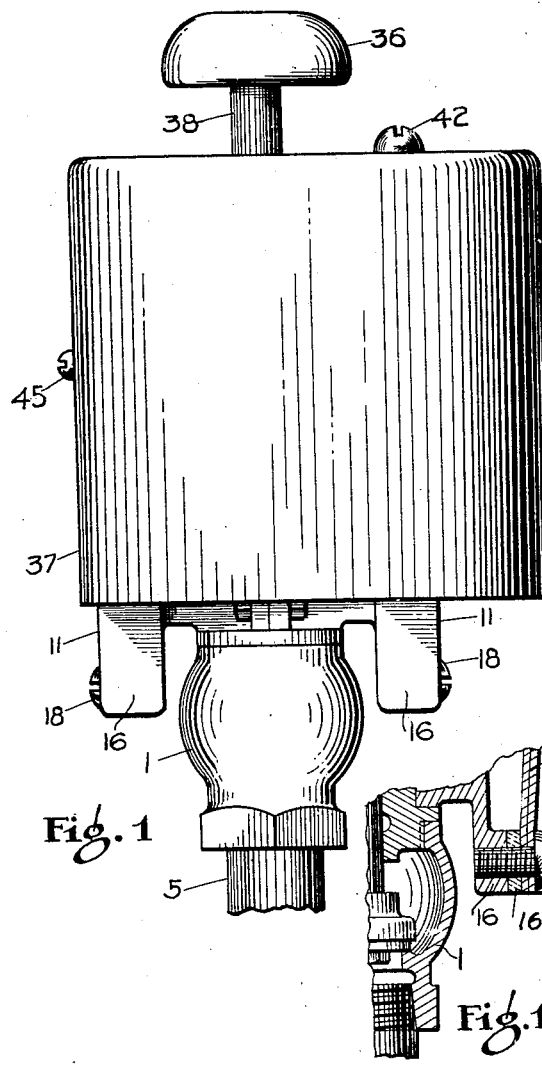
Fig. 1
Fig. 18
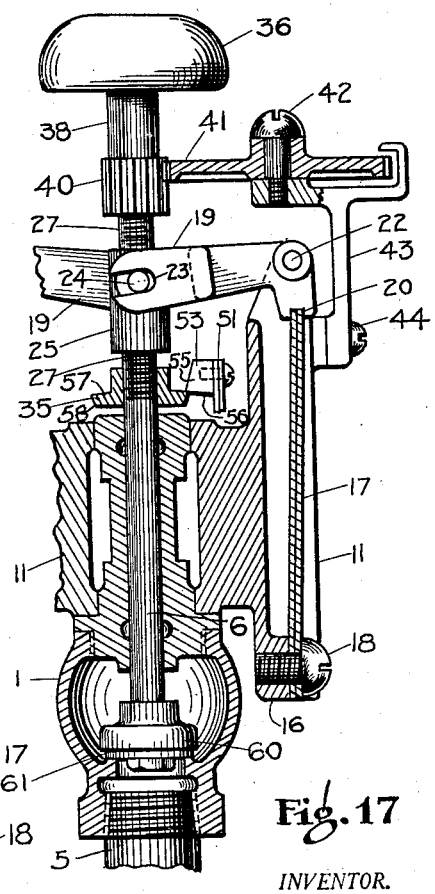
Fig. 17
INVENTOR.
Ernest J. Lees,
BY
Arthur H. Van Horn
His ATTORNEY.

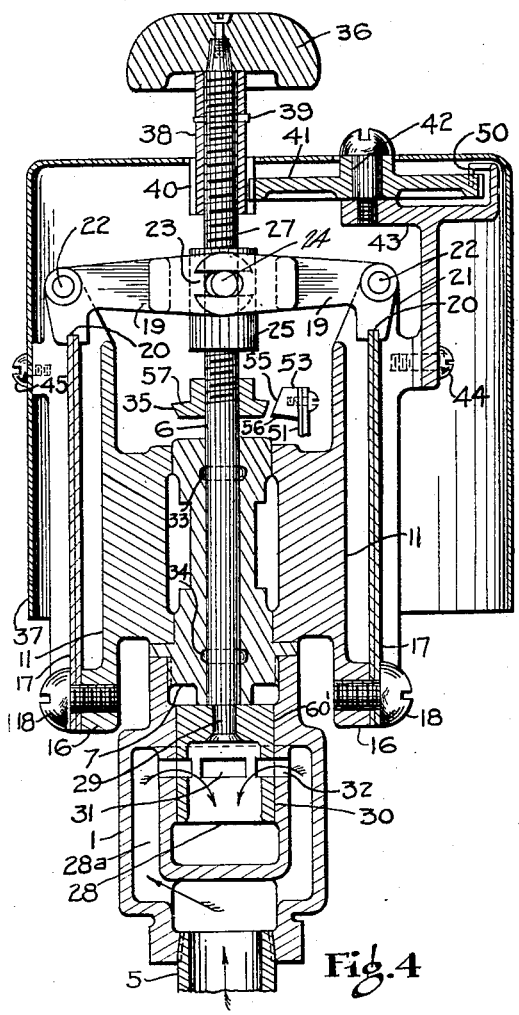
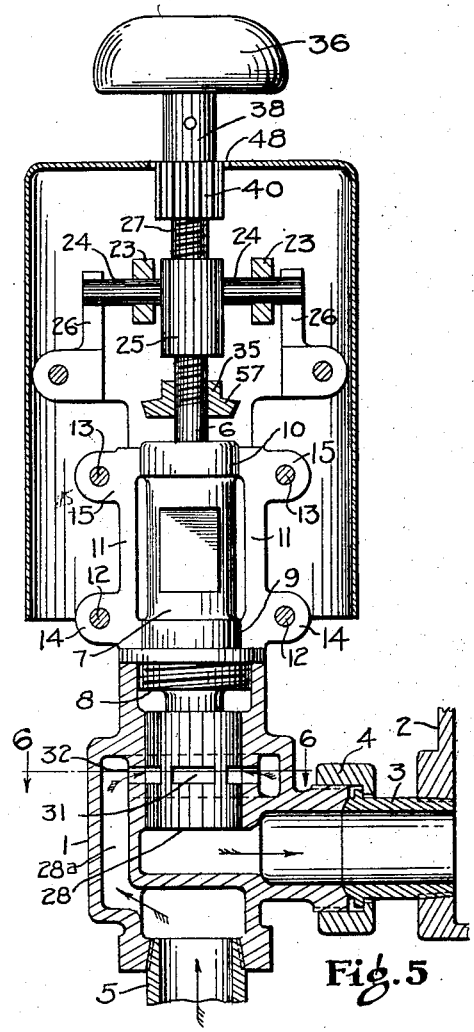
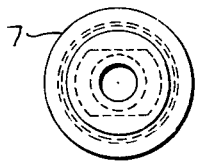
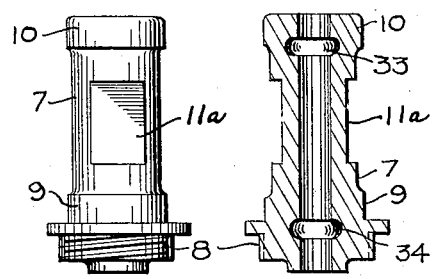

May 26, 1931.  E. J. LEES  1,807,101
AUTOMATIC TEMPERATURE CONTROL
Filed Aug. 9, 1929   5 Sheets-Sheet 3

INVENTOR.
Ernest J. Lees,
BY Arthur H. Van Horn
his ATTORNEY.

May 26, 1931.   E. J. LEES   1,807,101
AUTOMATIC TEMPERATURE CONTROL
Filed Aug. 9, 1929   5 Sheets-Sheet 4

INVENTOR.
Ernest J. Lees,
BY
Arthur N. Van Horn
His ATTORNEY.

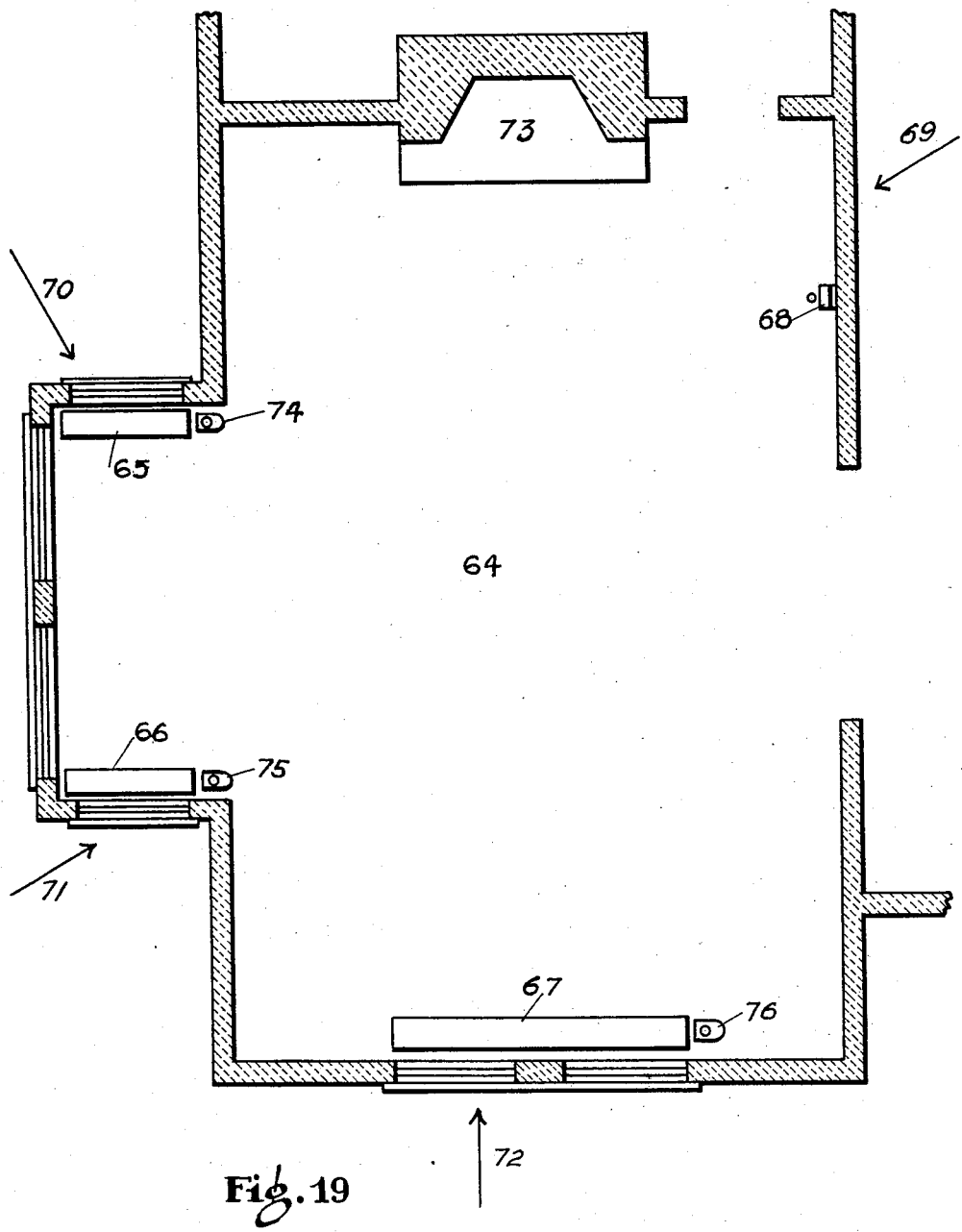

Patented May 26, 1931

1,807,101

UNITED STATES PATENT OFFICE

ERNEST J. LEES, OF SHAKER HEIGHTS, OHIO

AUTOMATIC TEMPERATURE CONTROL

Application filed August 9, 1929. Serial No. 384,588.

My invention is an improvement in automatic temperature controls and relates more particularly to a method and apparatus for automatically and individually regulating the temperature of one or more rooms or portions thereof, which are heated by means of radiators or the like.

In automatically controlling temperatures in one or more rooms heated by a medium supplied from a single heating plant, one method has been to rely upon a centralized thermally responsive device for regulating the supply of heating medium to the radiators or other heat dissipating devices the said device being remotely located with respect to the individual radiators. By this method portions of a room exposed to cold winds from the outside cannot be maintained at a temperature substantially uniform with that of other portions of the room, or other rooms, which are not exposed on their exterior to cold blasts, or in which, for example, a fire place, is located. A centralized remote thermostatic control for heating plants is therefore not accurate since it is responsive only to the temperature in the immediate vicinity of its location, which may be in a room distantly located with respect to a room in which a rise or drop in temperature is desired. Under the present practice this is accomplished by manually opening or closing the valve on the radiator. This requires constant attention and is inconvenient.

Under the present practice a proper automatic distribution of heat from a heating plant to one or more enclosed areas is not obtainable and obviously results in unnecessary fuel consumption.

One of the objects of my invention is to eliminate a centralized thermostatic control and its attendant disadvantages, and to automatically control the temperature of that portion of a room in the vicinity of a radiator or the like within desirable limits, or, if the room is of a size requiring more than one radiator, then to individually control each of the radiators independently whereby the temperature in the vicinity of that particular part of the room where each radiator is located may be kept within desirable limits or at a substantially uniform degree.

A further object of my invention is to provide an automatic control of the class mentioned which may be used in heating systems employing steam vapor or other heating mediums.

Another object of my invention is to thermostatically actuate a valve controlling the supply of a heating medium to a radiator or other heat dissipating device, whereby the response of the thermostatic element or elements to a variation of temperature will build up a force, which when released is sufficient to instantaneously operate the valve in one direction.

Another object of the invention is to construct a suitable adapter whereby a control of the above named character may be used with the conventional radiator valve, or which may be incorporated conveniently with valves which are already in use.

Other objects and advantages of my invention will become more apparent as the following description of several embodiments thereof progresses, reference being made to the accompanying drawings in which like characters are employed to designate like parts throughout the same.

In the drawings—

Fig. 1 is a side elevation of the preferred form of my invention showing the same applied to a conventional radiator valve of the piston type and showing the protective cover in place.

Fig. 2 is a plan view of Fig. 1.

Fig. 3 is a plan view of the indicator means showing the valve stem in section.

Fig. 4 is a section taken on line 4—4 of Fig. 2.

Fig. 5 is a sectional view of my invention shown in Fig. 1, the view being at substantially 90° to that of Fig. 4.

Fig. 6 is a section taken on line 6—6 of Fig. 5.

Fig. 7 is an elevation of an adapter forming a part of my invention.

Fig. 8 is a plan view of the adapter.

Fig. 9 is a central longitudinal section through the adapter.

Fig. 17 is a fragmentary section similar to Fig. 13 but showing the valve closed.

Fig. 18 is a fragmentary section of Fig. 17 showing a third embodiment of my invention.

Fig. 19 is a partial plan view of a house illustrating the application of my invention.

Figure 12:
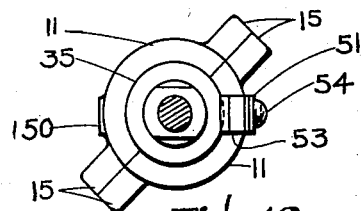
Fig. 12 is a top plan view of Fig. 11.

In the accompanying drawings I have illustrated several embodiments of my invention as applied to radiator valves of the conventional piston or plunger types.

Referring more particularly to Figs. 1 to 10 inclusive, which are illustrative of the preferred form of my invention, the body 1 of a conventional radiator valve of the piston type is connected to the radiator 2 in the usual manner by means of a short pipe 3 and the flange nut 4 and is also connected to a heating medium supply conduit 5. In adapting my invention to a conventional valve, the stem is removed and an elongated valve stem 6 is substituted therefor.

An adapter 7, illustrated in detail in Figs. 7, 8 and 9, is axially arranged with respect to the stem and is provided at its lower end with a threaded portion 8, whereby it may be screwed into place in the valve body 1. The adapter 7 is a substantially cylindrical spool shaped element having lower and upper cylindrical surfaces 9 and 10 of slightly greater diameter than that of the body 7. The stem 6 is capable of axial and rotary movement within the adapter, as will be more fully described hereinafter.

It is to be noted that the adapter may be used in connection with different types of valves by simply changing its outline to meet the necessary requirements. In this manner the frame 11 may be made in standard sizes and be applied to valves of different types by the use of a suitably shaped adapter. It is to be understood, therefore, that I do not limit myself to the size or shape of the adapter here illustrated. If desired, the adapter may have flattened sides 11a to permit the use of a wrench when assembling the adapter to the valve body.

I have provided means for supporting one or more thermostatic elements adjacent the valve body 1, which consists of cooperating sectional frame members 11. These sections are fittend about the portions 9 and 10 of the adapter and are secured in place by the screws 12 and 13 carried by the lugs 14 and 15 respectively, forming a substantially unitary structure on the valve body. The clamping members 11 are each provided with apertured depending bosses or lugs 16. Suitable thermostatic elements 17 of conventional design and employing strips of metals having different coefficients of expansion, are secured at one end to the bosses 16 by means of screws 18, the other end of each element 17 respectively engaging a slot 20 in the depending arms of the respective bell cranks 19. Each of the bell cranks or rocking levers is fulcrumed in the frame 11 by a pin at 22, supported in the bearings 21.

As shown in Fig. 4 the longer arms of the respective rocking levers 19 extend toward each other and their ends are forked as at 23 to receive and engage the trunnions 24 carried by the nut 25. The outer ends of the trunnions operate between the portions 26 of the frame 11 when axial movement is imparted to the stem 6. The nut 25 is, of course, threaded, as is a portion of the valve stem 6 at 27, to permit relative axial adjustment between the stem and nut 25 as when making an adjustment by turning the knob 36.

Figure 10:
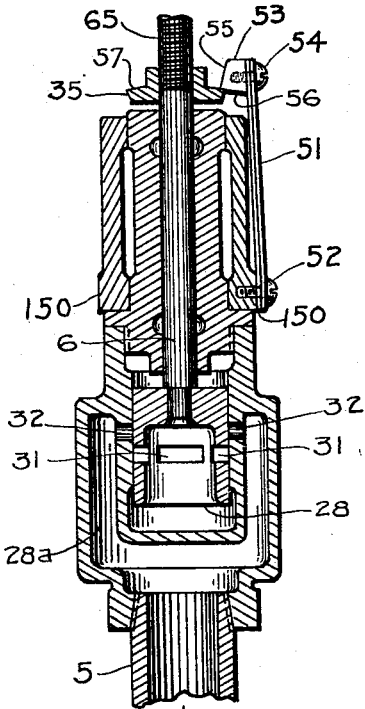
Fig. 10 is a longitudinal section through the valve stem and associated elements, showing the piston valve held in closed position.
Figure 15:
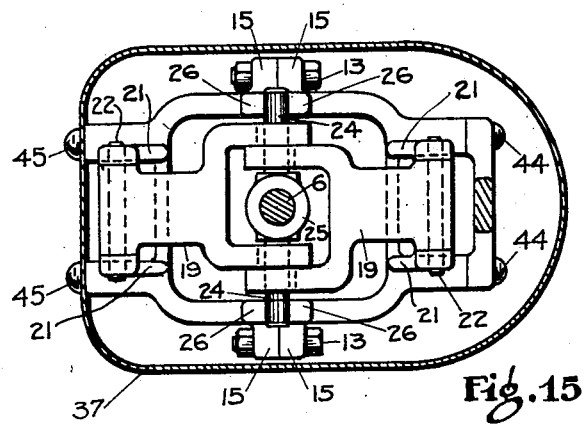
Fig. 15 is a section on line 15—15 of Fig. 13.
Figure 16:
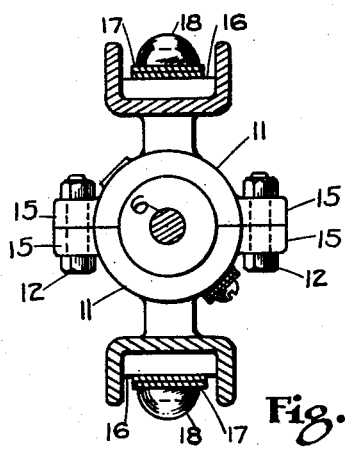
Fig. 16 is a section on line 16—16 of Fig. 13.

To the lower end of the valve stem 6 a valve head 28 of the piston type is secured by means of a stud 29. The piston is movable in the cylinder 30 and is provided with ports 31 which register with the ports 32 in the cylinder when the valve is raised to the positions shown in Figs. 4 and 5. In Fig. 10 these parts are out of register with the ports 31.

Figure 11:
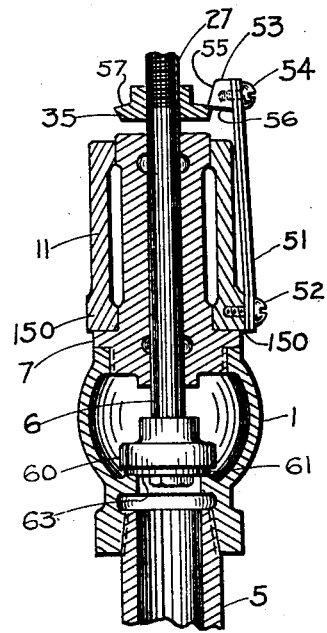
Fig. 11 is a similar section to that shown in Fig. 10 and shows the parts used in connection with a plunger type valve embodying a second form of my invention.

It will be noted that the valve stem 6 is both rotatably and slidably mounted in the adapter and frame assembly, and that the adapter is internally grooved at 33 and 34 to provide water packings when steam is the heating medium and condenses in these grooves. The valve stem carries a disc 35 which is threaded on the stem as shown in Figs. 10 and 11. The purpose of this disc will be more fully described hereinafter.

A knob or grip 36 is fitted on a squared shoulder at the upper end of the valve stem 6 in the usual manner, so that it may easily be removed when assembling or removing the protecting casing 37.

I have provided an indicating means for predetermining the periods during which the thermostats respond to open or close the valve. This means is illustrated in Figs.

4, 13 and 17, and in detail in Fig. 3, and includes a sleeve 38 keyed to the stem at 39, a pinion 40 rotatable with the sleeve and stem, and a larger gear 41 with which the pinion meshes. The gear 41 is rotatably supported at 42 in a bracket 43. The bracket 43 is supported from the frame 11 by means of screws 44.

The cover 37 is secured to the frame by screws 45 and is apertured at 46, 47 and 48 to permit the stem 6 to pass therethrough at 48, to receive the screw 42, and to provide a window at 47, whereby the operator may observe the markings on the gear 41 as the gear is rotated beneath the pointer 49. A stop, in the nature of a pin 50, is carried by the gear 41 to limit its rotation to one revolution only, the stop engaging the pointer 49 at either side thereof as the gear approaches its limit of rotation in either direction.

Referring now more particularly to Fig. 10, a third thermostatic element 51 of conventional design is secured at one end to the boss 150 of the frame 11 by means of a screw 52, the screw 52 operating in a slightly elongated opening in the thermostat to allow some vertical adjustment of the thermostat when desired. The thermostat carries at its free end a trip or projection 53 secured thereto by the screw 54, and having bevelled side and bottom edges 55 and 56. The under bevelled surface 56 of this projection engages a similarly bevelled annular surface 57 of the disc 35 secured to the stem 6, the angularity of these engaging surfaces being such as to prevent slipping between these surfaces when the parts are in the position shown in Fig. 10. The outer annular wall 58 of this disc is also bevelled or inclined inwardly, to reduce friction between the surfaces 55 and 58 when the disc is lowered in the path of the projection 53, which has been moved toward the stem 6 when the thermostat 51 responds to the rise in temperature.

It will be noted that I have provided independent thermostatic elements designated at 17 and 51 respectively. In this connection I desire to point out that the thermostats 17 are so arranged that in responding to a rise in temperature, their upper ends will move away from the axis of the valve stem, while the upper end of the thermostat 51 in responding to a rise in temperature, will move toward the axis of the valve stem and vice versa.

The operation of the preferred embodiment as illustrated in Figs. 1 to 10 is as follows:

Assuming that the knob 36 is turned to open the valve 1, thereby admitting the heating medium from the pipe 5 into the body 1 and through the pipe 3 to the radiator 2, the entire assembly will gradually become hot. As this rise in temperature is transmitted through the valve body and the adapter 7, the frame 11 will also rise in temperature, whereupon the thermostat 51 will respond and move toward the stem 6 before the thermostats 17 respond to the rise in temperature. In this manner the projection carried by the thermostat 51 will be thrust into the path of the disc and as the thermostats 17 respond to lower the stem and disc the surfaces 58 and 55 of the disc and projection respectively, are free to move over one another to push the thermostat 51 outwardly under tension whereby it will snap back toward the stem and the surfaces 56 and 57 will engage one another when the stem has reached the downward limit of its movement. The surfaces 56 and 57 are inclined at such an angle as to prevent slipping of the projection from the upper surface of the disc.

It will be seen that, with the parts in the position shown in Fig. 10, the piston valve head 28 is forced down into the cylinder 30 to bring the ports 60 and 62 out of register, thus shutting off the supply of heating medium to the radiator.

As the thermostats 17 assume the position shown in Fig. 17, the upper ends of these elements working in the slots 20 of the bell cranks 19 rock the latter about their fulcrums 21, thus forcing the long arms of the cranks downwardly. Downward movement of these crank arms will force the valve stem axially downwardly, since the nut 25 carried by the stem is provided with the trunnions 24, which enter the forked ends of the cranks.

Since the valve stem is capable of axial movement, the pinion 40 is provided with elongated teeth so that it will remain in mesh with the gear 39 during any axial movement of the valve stem.

It will be apparent that when the valve stem is in its uppermost position, it will require more time for the thermostats 17 to close the valve, since the valve stem will have to travel a greater distance to close the valve. Therefore, in order to compensate for this in the indicator, the gear 41 is of such diameter that it may be turned through only one revolution while the pinion 40 is turning through several.

I have arranged a progressive series of indicia or numerals from 1 to 12 on the upper face of the gear 41 to indicate the position of the valve head in the cylinder and consequently the period within which the valve may be closed for a given change in temperature.

When heat is applied through the valve body 1, it will be apparent that the thermostat 51 will heat up faster than the elements 17 and that it will react more quickly than the latter, since a rise in temperature is transmitted to it more directly and quickly through the adapter 7. Consequently when the valve is closed, the thermostats 17 cool more quickly than the thermostat 51, whereby they tend to return to the position shown in Fig. 3, but, since thermostat 51 is closer to the source of heat it tends to remain in its position in engagement with disc 32, as shown in Fig. 10.

The thermostats 17 are consequently placed under considerable tension tending to lift the stem 6 during the cooling period, but due to the fact that the thermostat 51 is closer to the heated valve, it cools more slowly and delays the release of the stem. The upward pressure on the steam is thus harnessed until such time as the thermostat 51 cools sufficiently to disengage the stop 53 from the disc 35, when it is released instantaneously resulting in the valve head being lifted quickly in the cylinder to again bring the ports 31 and 32 into register to admit another charge of heating medium to the radiator. This action may be designated as a "load and fire" action controlled by a variance in temperature as a motive force.

The valve being thus opened, the cycle of operation is repeated as before, the setting of the numeral on the gear 41 under the pointer 49 determining the period of operation of the valve during which the heating medium will be admitted through the valve 1 to the radiator 2. In this way the temperature of the room may be automatically controlled to a predetermined degree.

In the event that the heating medium is to be supplied to larger radiators and the period during which the medium is supplied needs to be prolonged, then a washer of nonconductive material may be placed between the thermostats 17 and the lugs 16 as shown at 16a in Fig. 18.

Referring now more particularly to Figs. 11 to 18 inclusive, in which I have illustrated another embodiment of my invention, the valve is of the plug or plunger type and is designated generally at 1. The lower portion of this valve is threaded to receive the feed pipe 5, and the upper portion is threaded at 8 to receive the adapter 7. The valve head 60 and a washer 61 are secured to the valve stem 6 by means of a nut 62.

A frame 11 similar to that described in connection with Figs. 1 to 10 inclusive, is clamped to the adapter 7, in the manner already described. A detailed description of the remaining structure employed in the embodiment illustrated in Figs. 11 to 18 is not thought to be necessary here, since it is substantially the same as that illustrated in connection with the preferred embodiment illustrated in Figs. 1 to 10 inclusive.

Figure 13:
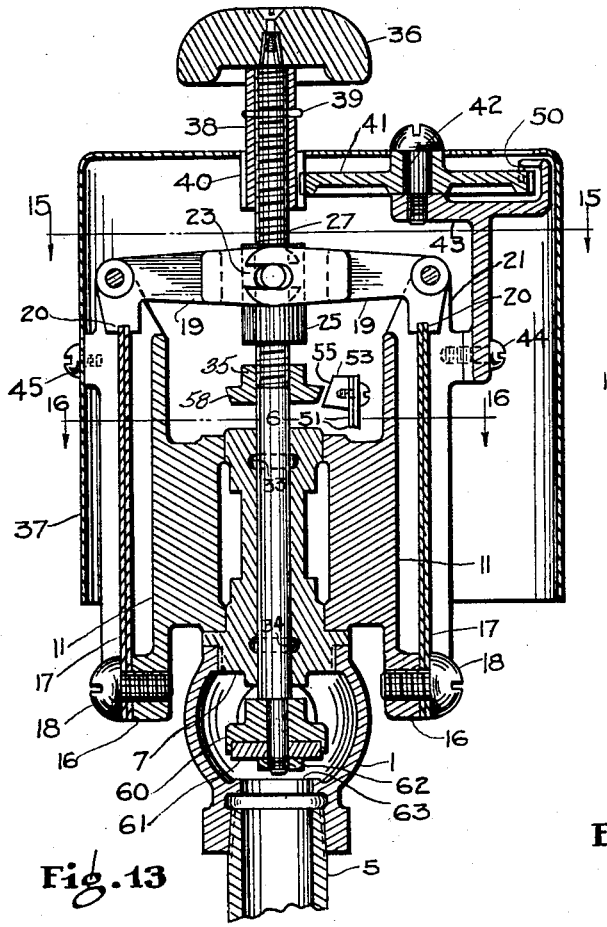
Fig. 13 is a section on line 4—4 of Fig. 2, but illustrating a second embodiment of my invention.
Figure 14:
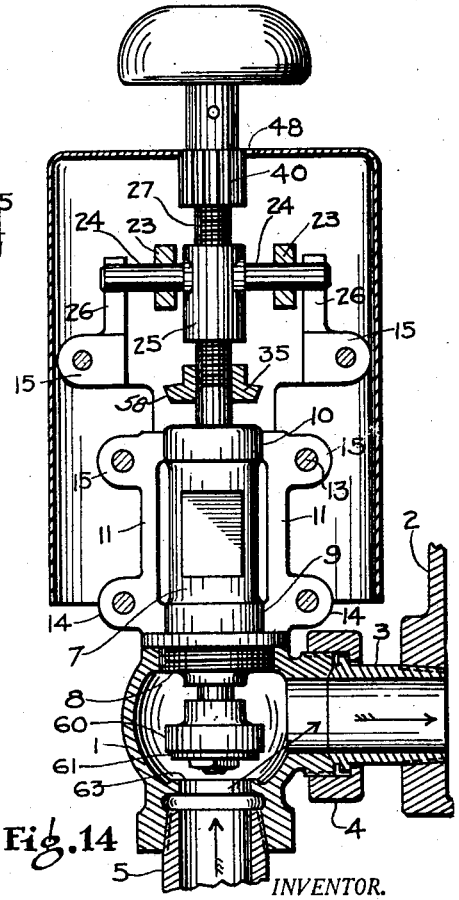
Fig. 14 is a part sectional view of the invention shown in Fig. 13, the section being substantially at right angles to that of Fig. 13.

The operation of the present embodiment of my invention is as follows:

In Fig. 13 the valve head 60 is in its uppermost or open position. In this position the heating medium enters the valve body from pipe 5 and travels into pipe 3 to the radiator 2. As the thermostats 17 react to the rise in temperature they force the stem 6 downwardly, as described hereinbefore, to close the valve by bringing the head and washer down tight upon the seat. Downward movement of the stem forces the disc past the projection on the thermostat 51, which in responding to the rise in temperature, has advanced the projection into the path of movement of the disc.

As the temperature falls the thermostats 17 respond more quickly than the thermostat 51, as has been described, and exert an upward pressure on the valve stem, but since the thermostat 51 has not been cooled sufficiently to withdraw the trip or projection 53 from the disc 35, it will hold the valve closed until it responds to the drop in temperature and moves outwardly of the stem, whereupon the tension of the thermostats 17 is released to raise the stem and instantaneously unseat the valve to allow another charge of heating medium to enter the radiator. Thus this "load and fire" is employed as in the preferred embodiment.

The use of a piston valve as in the preferred embodiment is more desirable where a heating medium under high pressure is encountered, since this pressure has no influence on the piston as the pressure is balanced.

If desired I may employ with either embodiment a manually controlled shut off valve, whereby the heating medium may be shut off from entering the valve body 1.

In Fig. 19 I have illustrated the method of using my invention as applied to a large room heated by a plurality of radiators. The interior of a room is indicated at 64, in which radiators 65, 66 and 67 are situated.

In the present day practice of heating one or more rooms, one method consists of employing a centralized thermostatic control 68 remote from the respective radiators but at a convenient place in a room, as shown. Its response to a temperature variation automatically controls the supply of heating fluid at its source, such as a boiler. In the illustration, however, it will be evident that cold winds entering or striking at 69, 70, 71, or 72, will chill one portion of the room more than other portions. If the temperature of the room is controlled by the central thermostatic control 68, that thermostat is responsive only to a rise or fall in the temperature in the immediate vicinity of that particular point. Furthermore, if a fire is in the grate at 73, the thermostat 68 will respond at a relatively lower temperature with respect to the temperature in the vicinity of the radiator 66, for example, or in other parts of the room or house.

Therefore, to utilize the advantages of my invention, the following method may be used—

I equip each radiator in the room illustrated, or in different rooms, with a thermostatically controlled valve forming a part of my invention. These valves are indicated at 74, 75, 76 and may be set to respond to predetermined temperatures in accordance with my invention so that the room may be uniformly heated. For instance, if a cold blast were coming from the direction of the arrow 72, the valve 76 could be set to maintain the temperature in its vicinity at a higher degree and the other valves correspondingly set to give the room a uniform temperature. In this way one valve may be set to heat for a longer period, and another for a lesser period, and this is accomplished by my invention in the manner hereinbefore described.

Various changes in the details of construction and arrangement of parts may be made, without departing from the spirit of my invention or the scope of the subjoined claims.

I claim:

1. A control valve for heating units including thermally responsive means for operating the valve, and a second thermally responsive means for delaying the beginning of movement of the valve in one direction, whereby forces tending to move the valve in said direction may be accumulated and then quickly released to instantaneously move the valve in said one direction.

2. The combination with a control valve for heating units, of a valve stem, thermostatic means for moving the stem and valve in one direction upon a predetermined rise in temperature, said means exerting a force on the stem in the reverse direction upon a lowering of the temperature to a predetermined degree, and thermally responsive means to delay the release of the stem and valve in the said reverse direction whereby the forces so exerted on the valve stem tending to move the valve in said direction may be accumulated and then quickly released.

3. The combination with a control valve for heating units, of thermally responsive means carried by the valve and connected with the stem of the valve for actuating the valve in opposite directions, and thermally responsive means for delaying the action of the valve in one direction.

4. In an automatic valve, a valve stem, thermally responsive means for moving the stem longitudinally in either direction, means to predetermine the temperature at which said valve stem may be operated, and thermally responsive means associated with said thermally responsive means to release the valve stem for movement quickly in one direction subsequent to the response of said first named thermally responsive means to a variation in temperature.

5. In an automatic valve, a valve stem, thermally responsive means for actuating the stem in a plurality of directions and thermally responsive means associated with said first named thermally responsive means to release the valve stem for movement quickly in one direction.

6. In an automatic valve, a valve stem, thermally responsive means for actuating the stem in a plurality of directions and thermally responsive means associated with said first named thermally responsive means to accumulate the forces set up in said first named means by a variation in temperature and then release the forces to quickly actuate the valve stem in one direction, the response of said second thermally responsive means to variation in temperature lagging behind the response of said first named means.

7. In an automatic valve, a valve body, a frame carried by the body, a valve stem operable through the frame, thermostats supported by the frame, means operable by certain of the thermostats to move the stem axially in either direction, and a trip operable by another of said thermostats to quickly release the stem for movement in one direction under the influence of said first mentioned thermostats.

8. In an automatic valve, a body, a frame carried by the body, a valve stem operable through the frame, thermostats supported by the frame, means operable by certain of the thermostats to move the stem axially in either direction, and a trip operable by another of said thermostats to quickly release the stem for movement in one direction under the influence of said first named thermostats, and means to predetermine the temperature at which the valve may be operated.

9. In an automatic valve, a valve body, a frame carried by the body, a valve stem operable through the frame, thermostats supported by the frame, means operable by certain of the thermostats to move the stem axially in either direction, a stop carried by the valve stem, a member carried by another of said thermostats and engaging said stop to retain the stem in one of its extreme positions, said last named thermostat being so located with respect to the other thermostats that its response to a drop in temperature lags behind that of the first named thermostats, whereby said stem may be quickly released and thrust to its other extreme position.

10. In an automatic valve, a valve body, a frame carried by the body, a stem movable through the frame, thermostats supported by the frame, a nut adjustable on the stem and having trunnions extending therefrom, bell cranks pivoted to the frame and actuated by said thermostats, said bell cranks having forked ends for receiving the said trunnions, a stop carried by said stem, and a thermostat supported by the frame, said last named thermostat having a projection on its free end and movable in the path of said stop to engage the same when the stem is in one of its extreme positions.

11. The combination with a control valve for heating units comprising a valve body, a valve seat in the body, a valve stem and a head on said stem for engaging the seat, of thermally responsive devices for moving the stem axially, and thermostatic means for delaying the beginning of movement of the valve head away from the seat, whereby the forces tending to move the head away from the seat may be accumulated and then quickly released to instantaneously open the valve.

12. The combination with a control valve for heating units comprising a valve body, a valve seat in the body, a valve stem and a head on said stem for engaging said seat, of thermally responsive devices for moving the stem axially, thermostatic means for delaying the beginning of movement of the valve head away from the seat, whereby the forces tending to move the head away from the seat may be accumulated and then quickly released to instantaneously open the valve, and means to regulate the release of the valve to occur at a predetermined temperature.

13. In combination, a control valve, thermally responsive means associated therewith for opening said valve, and a second thermally responsive means for delaying the opening of the valve until the forces exerted by said first thermally responsive means on the valve in response to a predetermined variation in temperature are accumulated sufficiently to effect an instantaneously opening of said valve when said second thermostatic means is actuated.

In testimony whereof I hereunto affix my signature this 30th day of July, 1929.

ERNEST J. LEES.

DISCLAIMER 1,807,101.—*Ernest J. Lees*, Shaker Heights, Ohio. AUTOMATIC TEMPERATURE CONTROL. Patent dated May 26, 1931. Disclaimer filed December 2, 1932, by the *patentee*.

Hereby enters this disclaimer to claim five (5) which is in the following words, to wit:

"5. In an automatic valve, a valve stem, thermally responsive means for actuating the stem in a plurality of directions and thermally responsive means associated with said first named thermally responsive means to release the valve stem for movement quickly in one direction."

[*Official Gazette December 27, 1932.*]